UNITED STATES PATENT OFFICE.

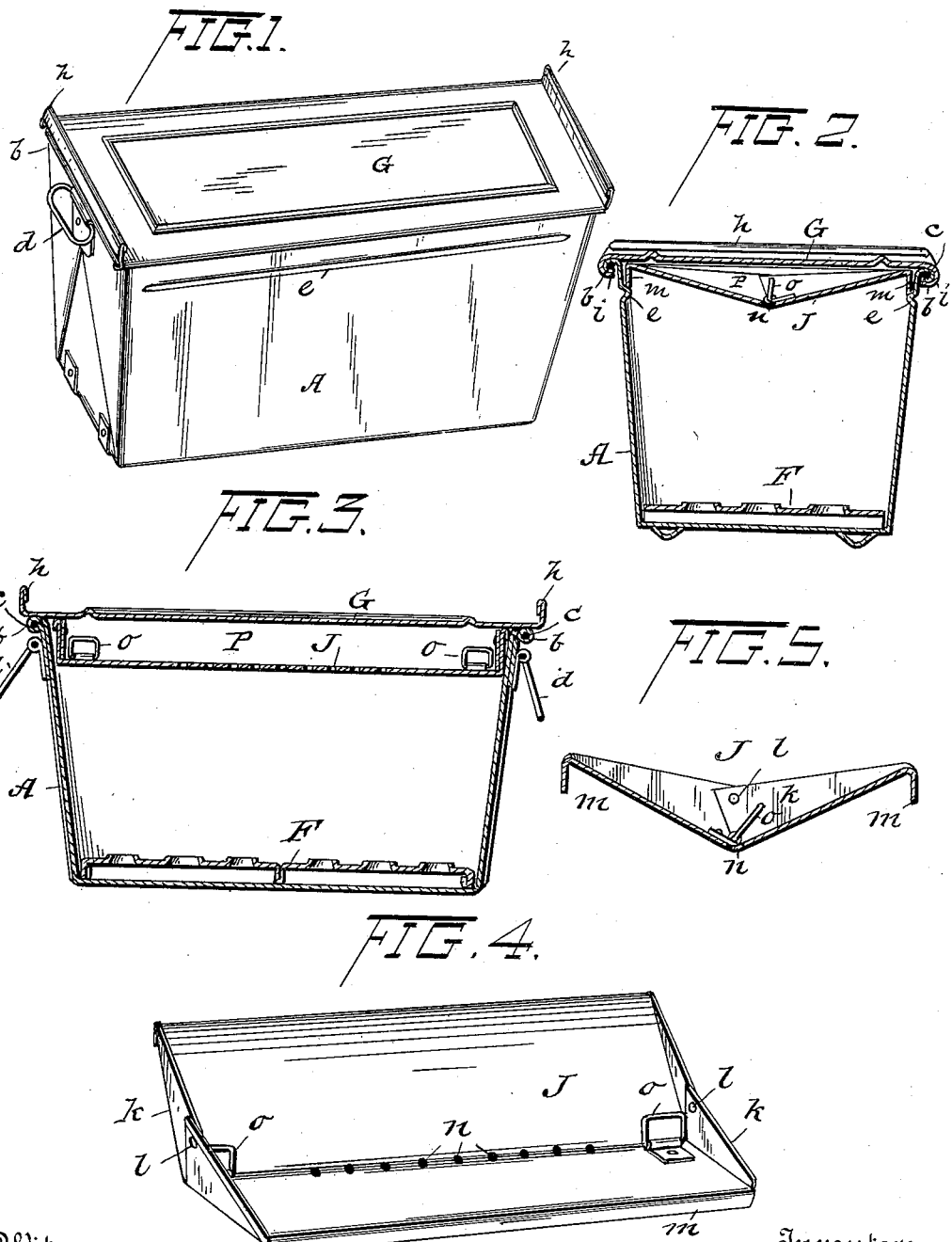

ELIJAH C. RINNER AND PETER P. DE HART, OF COSHOCTON, OHIO.

SELF-BASTING BAKING OR ROASTING PAN.

SPECIFICATION forming part of Letters Patent No. 615,638, dated December 6, 1898.

Application filed August 11, 1898. Serial No. 688,391. (No model.)

*To all whom it may concern:*

Be it known that we, ELIJAH C. RINNER and PETER P. DE HART, citizens of the United States, residing at Coshocton, in the county of Coshocton and State of Ohio, have invented certain new and useful Improvements in Self-Basting Baking or Roasting Pans; and we do hereby declare the following to be a full, clear, and exact description of the invention, such as will enable others skilled in the art to which it appertains to make and use the same.

This invention relates to improvements in self-basting baking or roasting pans, the object being to provide a pan of this character in which the moisture resulting from the condensation of the steam is conducted back into the pan to baste the contents thereof, and also to provide a pan of simple and cheap construction wherein the parts are readily accessible for cleaning and removal and designed to perform the operation of basting in an efficient manner.

To this end the invention consists in certain novel details of construction, combination, and arrangement of parts, which will be hereinafter more fully described, and particularly pointed out in the appended claims.

In the accompanying drawings, Figure 1 is a perspective view of a baking-pan constructed in accordance with our invention. Fig. 2 is a vertical longitudinal section of the pan. Fig. 3 is a vertical transverse section of the same. Fig. 4 is a perspective view of the drip-tray. Fig. 5 is a cross-section thereof.

Referring now more particularly to the drawings, wherein like letters of reference designate corresponding parts throughout the several views, A represents a sheet-metal baking-pan, of the usual or any other desired form suitable for the purpose, provided with an outturned bead or rim $b$, coiled around a stiffening-wire $c$, and a pivoted loop-handle $d$ at each end thereof, whereby it may be conveniently lifted and transported. The sides of the pan are indented longitudinally immediately below the said rim or bead to form inwardly-projecting supporting-beads $e$, and resting on the bottom of the pan is a perforated tray F, on which the meat or fowl to be roasted is placed.

The pan is adapted to be closed by a cover G, consisting of a flat sheet-metal plate having its ends bent to form flanges $h$, serving as handles or finger-pieces whereby the cover may be inserted and removed, and its side edges bent to form hook-shaped flanges or guides $i$, which are adapted to engage the side rims or beads $b$ on the pan to retain the cover in position thereon. By employing a cover of this construction instead of the usual curved or arched top cover having a flange to enter or fit around the pan the cost of production is reduced, a pan of minimum size, but of maximum capacity, provided, oven-space economized, and the cover may be partially removed when it is desired to inspect the contents of the pan without the necessity of removing the pan from the oven.

Arranged in the pan below the cover is a removable drip-tray J, formed from a single piece of sheet metal bent along its longitudinal center into the form of a trough which is V-shaped in cross-section. The ends $k$ of this trough are divided centrally and overlap and are united by rivets $l$ by which the trough is strengthened and retained in shape, while the edges of the inclined sides of the trough or tray thus formed are bent to form flanges $m$, which rest upon the beads $e$ on the sides of the pan and support the tray. The tray is provided at the center with a series of perforations $n$, through which the condensed moisture drips back into the pan, and at its ends with loop-handles $o$, by which it may be readily and conveniently inserted and removed. By reference to Figs. 2 and 3 it will be seen that the tray is arranged just below the cover and that a space or chamber P is thereby formed between the same for the circulation and condensation of the steam rising from the pan. The cover may be partially or wholly removed without interfering with the drip-tray, and the latter may also be independently detached.

In operation the roast is placed upon the tray F, the drip-tray placed in position, and the sliding cover closed. The steam arising from the contents of the pan will flow through the perforations in the drip-tray into the chamber P and circulate therein and condense on the inclined sides of the drip-tray. The moisture thus formed will then run down said inclined sides to the center of the tray and drip through the perforations therein down upon the roast in the pan, thereby effecting an automatic basting of the roast in a simple and effective manner. After the roast has been sufficiently basted the cover may be slid back sufficiently to allow the greater part of the steam to escape to the atmosphere and permit the roast to brown.

Having thus described the invention, what is claimed as new is—

1. In a cooking utensil of the character described, the combination with a pan provided with a cover and supports on its interior immediately below the cover, of a drip-pan bent longitudinally along its center and having its ends divided and the sections thereof united to form a V-shaped trough, said trough having its side edges turned down to form supporting-flanges to rest on the said supports of the pan and provided in its center at the lower ends of its inclined sides with perforations, and handles on the interior of the trough adjacent to said ends, substantially as described.

2. A self-basting baking and roasting utensil, comprising a pan provided immediately below the top thereof with supporting-beads, a sliding cover, and a V-shaped drip-tray provided with downturned side flanges to rest on said beads, perforations in the center thereof at the lower ends of its inclined sides, and handles on its interior adjacent to its ends, said tray forming at the top of the pan in conjunction with the cover a V-shaped condensing-chamber from which the direct escape of steam to the atmosphere is regulated by sliding said cover open to the desired extent, substantially as described.

In testimony whereof we affix our signatures in presence of two witnesses.

ELIJAH C. RINNER.
PETER P. DE HART.

Witnesses:
BENJ. F. TALLMADGE,
WILBER C. BARTON.